(12) United States Patent
Evertz et al.

(10) Patent No.: US 8,820,343 B2
(45) Date of Patent: Sep. 2, 2014

(54) COUPLING ACTUATING ELEMENT OF VALVE TO CONNECTION ELEMENT OF ACTUATOR

(75) Inventors: Jörg Evertz, Birmensdorf (CH); Martin Sprecher, Cham (CH)

(73) Assignee: Siemens Aktiengesellschaft, Munich (DE)

( * ) Notice: Subject to any disclaimer, the term of this patent is extended or adjusted under 35 U.S.C. 154(b) by 826 days.

(21) Appl. No.: 13/074,853

(22) Filed: Mar. 29, 2011

(65) Prior Publication Data
US 2011/0232091 A1  Sep. 29, 2011

(30) Foreign Application Priority Data

Mar. 29, 2010 (EP) .................................. 10158265

(51) Int. Cl.
| | | |
|---|---|---|
| F16B 5/00 | (2006.01) | |
| F16B 9/02 | (2006.01) | |
| F16B 5/04 | (2006.01) | |
| F16K 31/05 | (2006.01) | |
| F16B 21/09 | (2006.01) | |

(52) U.S. Cl.
CPC ................ *F16K 31/05* (2013.01); *F16B 9/023* (2013.01); *F16B 5/04* (2013.01); *F16B 21/09* (2013.01)
USPC ...................... 137/15.17; 137/15.18; 251/291

(58) Field of Classification Search
USPC ...................... 137/15.17, 15.18; 251/77, 214, 251/291–292
See application file for complete search history.

(56) References Cited

U.S. PATENT DOCUMENTS

| | | | | |
|---|---|---|---|---|
| 4,272,053 A | * | 6/1981 | Wempe et al. | ................ 251/291 |
| 4,589,629 A | * | 5/1986 | Gaffney et al. | ................ 251/292 |
| 4,691,895 A | * | 9/1987 | Garff | ............................ 251/292 |

(Continued)

FOREIGN PATENT DOCUMENTS

| | | |
|---|---|---|
| CN | 2586032 Y | 11/2003 |
| CN | 101649773 A | 2/2010 |

(Continued)

OTHER PUBLICATIONS

"Die Richtige Wahl für die Um-und Nachrustung von HLK-Regelventilen"; Belimo; 2004.

*Primary Examiner* — John Bastianelli
(74) *Attorney, Agent, or Firm* — Staas & Halsey LLP

(57) ABSTRACT

The mechanical coupling of an actuating element of a valve to a connection element of an actuator is accomplished with the actuating element able to be displaced along a z-axis for the purpose of adjusting the valve and the connection element, at a corresponding orientation of the actuator, can likewise be displaced along the z-axis relative to the valve by the actuator. The device has (a) a first coupling element which can be coupled to the actuating element so that a certain freedom of movement is provided between the first coupling element and the actuating element along the z-axis, (b) a second coupling element which can be coupled to the connecting element, (c) a connecting element which links the two coupling elements to each other in a movable manner, and (d) a clamping device which is arranged on the first coupling element and/or on the second coupling element and which is embodied such that, upon an actuation of the clamping element the two coupling elements are braced against each other, and an actuating element coupled to the first coupling element is clamped without play to the two coupling elements along the z axis.

13 Claims, 4 Drawing Sheets

(56) References Cited

U.S. PATENT DOCUMENTS

| | | | |
|---|---|---|---|
| 6,854,704 B1 * | 2/2005 | Young | 251/291 |
| 2004/0216888 A1 | 11/2004 | Schmidt et al. | |
| 2009/0049671 A1 * | 2/2009 | O'Hara | 29/213.1 |

FOREIGN PATENT DOCUMENTS

| | | |
|---|---|---|
| CN | 101676588 A | 3/2010 |
| DE | 9114948 U1 | 3/1992 |
| EP | 10158265 | 3/2010 |

* cited by examiner

COUPLING ACTUATING ELEMENT OF VALVE TO CONNECTION ELEMENT OF ACTUATOR

CROSS REFERENCE TO RELATED APPLICATIONS

This application is based on and hereby claims priority to European Application No. 10158265 filed on Mar. 29, 2010, the contents of which is hereby incorporated by reference.

BACKGROUND

The device and method described below may be used for mechanically coupling an actuating element of a valve to a connection element of an actuator, wherein (a) the actuating element can be displaced along a z-axis for the purpose of adjusting the valve and wherein (b) the connection element, at a corresponding orientation of the actuator relative to the valve, can likewise be displaced along the z-axis by the actuator.

Heating, ventilation and air conditioning (HVAC) valves are typically actuated by an electric-motor-driven actuator. In order in such cases to be able to assign a precisely defined setting of the valve to a specific position of the actuator, which is an essential requirement for a precise activation of the valve, on the one hand the relative position between actuator and valve must be precisely defined. It is also advantageous for reliable operation of a valve and for specific applications it is even absolutely necessary to couple an actuating element (typically a plunger) of a valve to a connection element of an actuator with as little play as possible. In such cases it should be considered that a typical heating, ventilation and air conditioning system has a plurality of controllable valves and that often the installer responsible does not always work with the greatest of care during installation or maintenance of a heating, ventilation and air conditioning system.

SUMMARY

An aspect is to improve the coupling between actuator and valve in respect of (a) increased actuating precision of the valve and (b) simple, error-free, convenient and rapid assembly.

According to a first aspect a device mechanically couples an actuating element of a valve to a connection element of an actuator is described, wherein the actuating element can be displaced along a z-axis for the purpose of adjusting the valve and wherein the connection element, at a corresponding orientation of the actuating element relative to the valve, can likewise be displaced along the z-axis by the actuator. The described device has (a) a first coupling element which can be coupled to the actuating element in such a way that a certain freedom of movement is provided between the first coupling element and the actuating element along the z-axis, (b) a second coupling element which can be coupled to the connection element, (c) a connecting element which connects the two coupling elements to each other in a movable manner, and (d) a clamping device which is arranged on the first coupling element and/or on the second coupling element and which is embodied such that upon an actuation of the clamping element (d1) the two coupling elements are braced against each other and (d2) an actuator element coupled to the first coupling element is clamped free of play to the two coupling elements along the z-axis.

The coupling device described is based on the knowledge that when a mechanical coupling is established between the actuator element of the valve and the connection element of the actuator, at least a certain degree of play or a certain freedom of movement is provided in the axial direction (z-direction). This enables an operator to couple together the first coupling element and the actuator element in a simple manner and in particular without the risk of unwanted jamming between the first coupling element and the actuator element. Subsequently this play can be reduced continuously down to "zero" in the axial direction by actuation of the clamping device, such that the system formed by the two coupling elements and the actuating element becomes free of play at least in the axial direction.

Provided the relative axial position between the actuator and the valve is precisely defined, as a result of the play-free clamping of the actuating element, a specific setting of the valve can always be assigned with a high degree of precision to a specific position of the actuator. This enables a particularly precise control or regulation of the valve by the actuator.

The connecting element can be any type of fastening element which, in conjunction with the geometry of the first coupling element and/or the second coupling element, allows a certain relative freedom of movement between the two coupling elements. The connecting element can for example be a fixed screw connection or a rivet.

The actuating element of the valve can be a cylindrical pin, for example an ordinary plunger.

The advantage of the described device is that the actuating element of a valve can be mechanically linked or coupled at any rotational angle position to the connection element of the actuator. A further advantage of the described device lies in the fact that the device can be embodied so that an incorrect connection of the actuating element to the connection element can be reliably prevented.

According to an exemplary embodiment, the first coupling element and/or the second coupling element have a flat shape. This has the advantage that the entire coupling device can be realized in a compact design in particular in the axial direction. This enables the actuator to be arranged in turn close to the valve such that an entire valve system formed of a valve and an actuator can be built as a compact unit. This is of advantage in particular in the case of larger heating, ventilation and air conditioning systems which have a plurality of such valve systems arranged close together.

The term "flat" is to be understood in this context in particular as meaning that the height or thickness of the respective coupling element is significantly less than the width and/or the length of the coupling element. The term "flat" should in no way exclude in this context the presence of openings, notches or other recesses in the respective coupling element. The flat form can be essentially defined by the external dimensions of the respective coupling element.

The first coupling element and/or the second coupling element can for example be a plate, in particular a metal plate.

It is pointed out that the first and/or the second coupling element can also be realized by a wire bent in a suitable manner instead of by a flat plate.

According to a further exemplary embodiment, the first coupling element has a central opening with a first opening area and a second opening area. In this case the first opening area is dimensioned such that at least an upper section of the actuating element can be passed through the first opening area. Furthermore the second opening area is dimensioned so that an edge delimiting the second opening area of the first coupling element can engage in a recess embodied on the upper section of the actuating element so that, except for the certain degree of freedom of movement between the first coupling element and the actuating element along the z-axis, the actuating element is fixed to the first coupling element.

Expressed in visual terms this can mean that the two opening areas are different sizes. The upper section of the actuating element can be passed through the first larger opening area. The second opening area can be so small that it is only able to accommodate the upper section of the actuating element because the recess is embodied therein. An edge of the first coupling element or a projection protruding into the second opening area can namely engage in this recess and thus ensure the described axial form-fit fixing of the actuating element with play on the first coupling element. The initial axial freedom of movement of the actuating element in relation to the first coupling element can amount to a few millimeters for example.

The central opening, which does not necessarily have to be embodied exactly in the middle of the first coupling element, can have the shape of a keyhole for example. The first coupling element can consequently be a so-called keyhole plate or at least have approximately the shape of such a keyhole plate.

According to a further exemplary embodiment, the connecting element is embodied such that the first coupling element can be displaced perpendicular to the z-axis relative to the second coupling element.

The connecting element can for example be a screw connection or a rivet which extends through two openings embodied in the two coupling elements. In this case one opening in particular can be large enough for a right-angled displacement relative to the z-axis to be possible between the two coupling elements.

According to a further exemplary embodiment, the first coupling element can be rotated relative to the second coupling element around an axis of rotation which is defined by the connecting element. The advantage of this is that, through a simple rotary movement around the coupling element in which (a) the first coupling element is rotated relative to the second coupling element and/or in which (b) the second coupling element is rotated relative to the first coupling element, the described coupling device can be brought into a target position in which the two coupling elements can be braced against each other. There is no necessity to use a tool, at least for the described rotational movement around the z-axis.

According to a further exemplary embodiment, the first coupling element can be displaced radially relative to the second coupling element in relation to the z-axis.

The radial displacement capability can be provided for example by a slotted hole which is embodied in the first coupling element and/or in the second coupling element and through which the connecting element extends. The slotted hole in this case can be a slit embodied in the coupling element concerned.

Also in the case of a radial displacement capability, (a) the first coupling element can be brought into a target position relative to the second coupling element and/or (b) the second coupling element can be brought into a target position relative to the first coupling element through a simple manual operator intervention in which the two coupling elements can then be braced against each other.

According to a further exemplary embodiment, the device also has a further connecting element which links the two coupling elements to each other in a movable manner.

The further connecting element can contribute along with the connecting element already described above to the two coupling elements only being able to be displaced against each other and not rotated relative to each other.

Two through-holes can be embodied in such cases both in the first coupling element and in the second coupling element. In this case the connecting element can extend through a first through-hole and the further connecting element through the second through-hole. Here too the through-holes can once again be slotted holes whose longitudinal alignments extend at right angles to the z-axis.

According to a further exemplary embodiment, the connecting element and the clamping device engage in relation to the z-axis at opposing points on the two coupling elements. The advantage of this is that particularly favorable lever conditions can occur for the play-free clamping of the actuating element between the two coupling elements. This enables the clamping device to be actuated by an operator without any great application of force.

It is pointed out that the position of the z-axis can be defined by the radial position in which the actuating element or the plunger of the valve is clamped. In the case of the above-described central opening of the first coupling element the position of the z-axis is thus within the first (during assembly) and/or second (in the closed position) opening area.

According to a further exemplary embodiment, the device also has an adapter element which can be coupled to the second coupling element and the connection element. This can mean that the second coupling element can be coupled, not directly, but only indirectly to the connection element of the actuator via the adapter element.

The adapter element can for example be a sleeve which can be inserted from one side into a hole of the second coupling element.

According to a further exemplary embodiment, the adapter element is shaped so that upon actuation of the clamping device the adapter element will be clamped together with the actuating element by the two coupling elements along the z-axis without any play. The advantage of this is that when the clamping device is actuated, not only the connection between the first coupling element and the actuating element (e.g. the plunger of the valve) but automatically also the connection between the second coupling element and the adapter element becomes free of play.

The adapter element can for example have a shoulder which gives the adapter element a width perpendicular to the z-axis so that the adapter element does not pass completely but only partly through a hole embodied in the second coupling element.

According to a further exemplary embodiment, the adapter element has a transverse hole. The advantage of this is that the adapter element can be coupled particularly easily to the actuator connection element which is displaceable along the z-axis.

According to a further exemplary embodiment, the clamping device is a screw which has an undercut. This can have the advantage of enabling the overall device to be realized so that for example during an assembly activity in which the valve actuator is coupled to the connection element of the actuator, no parts of the device can get lost.

According to a further aspect, a method for mechanical coupling of an actuating element of a valve to a connection element of an actuator is described, wherein the actuating element is displaceable along a z-axis for the purpose of an adjustment of the valve and wherein the connection element, at a corresponding orientation of the actuator, can likewise be displaced relative to the valve along the z-axis by the actuator. The described method includes (a) a coupling of a first coupling element to the actuating element so that between the first coupling element and the actuating element at least a certain freedom of movement is provided along the z-axis, (b)

a coupling of the second coupling element to the connection element, wherein the second coupling element is connected to the first coupling element by a connecting element, and (c) an actuation of a clamping device which is arranged on the first coupling element and/or on the second coupling element so that (c1) the two coupling elements are braced against each other, and (c2) an actuating element coupled to the first coupling element is clamped free from play to the two coupling elements along the z-axis.

The coupling method described is also based on the knowledge that when a mechanical coupling between the actuating element and the connection element is established, initially at least a certain play or a certain freedom of movement in the axial direction (z-direction) makes it easier to establish this coupling. Actuating the clamping device causes this axial play to be reduced continuously down to "zero" such that the system formed of the two coupling elements and the actuating element is free from play.

According to an exemplary embodiment, the method additionally includes a displacement of the first coupling element relative to the second coupling element at right angles to the z-axis, the displacement being performed after the coupling of a first coupling element to the actuating element and before the actuation of the clamping device. This has the advantage that the coupling of the first coupling element to the actuating element can be performed without or with only a slight spatial obstruction by the second coupling element. The described coupling method is therefore able to be carried out in a particularly simple manner.

It is pointed out that embodiment variants, have been described in relation to both a device claims and a method. It will however be immediately clear to the person skilled in the art, when reading this application, that, unless explicitly stated to the contrary, in addition to a combination of features which belong to a type of object, any given combination of features is also possible which belong to different types.

BRIEF DESCRIPTION OF THE DRAWINGS

These and other advantages and features will become more apparent and more readily appreciated from the following description of exemplary embodiments, taken in conjunction with the accompanying drawings of which.

DETAILED DESCRIPTION OF THE PREFERRED EMBODIMENT

Figure 1A:
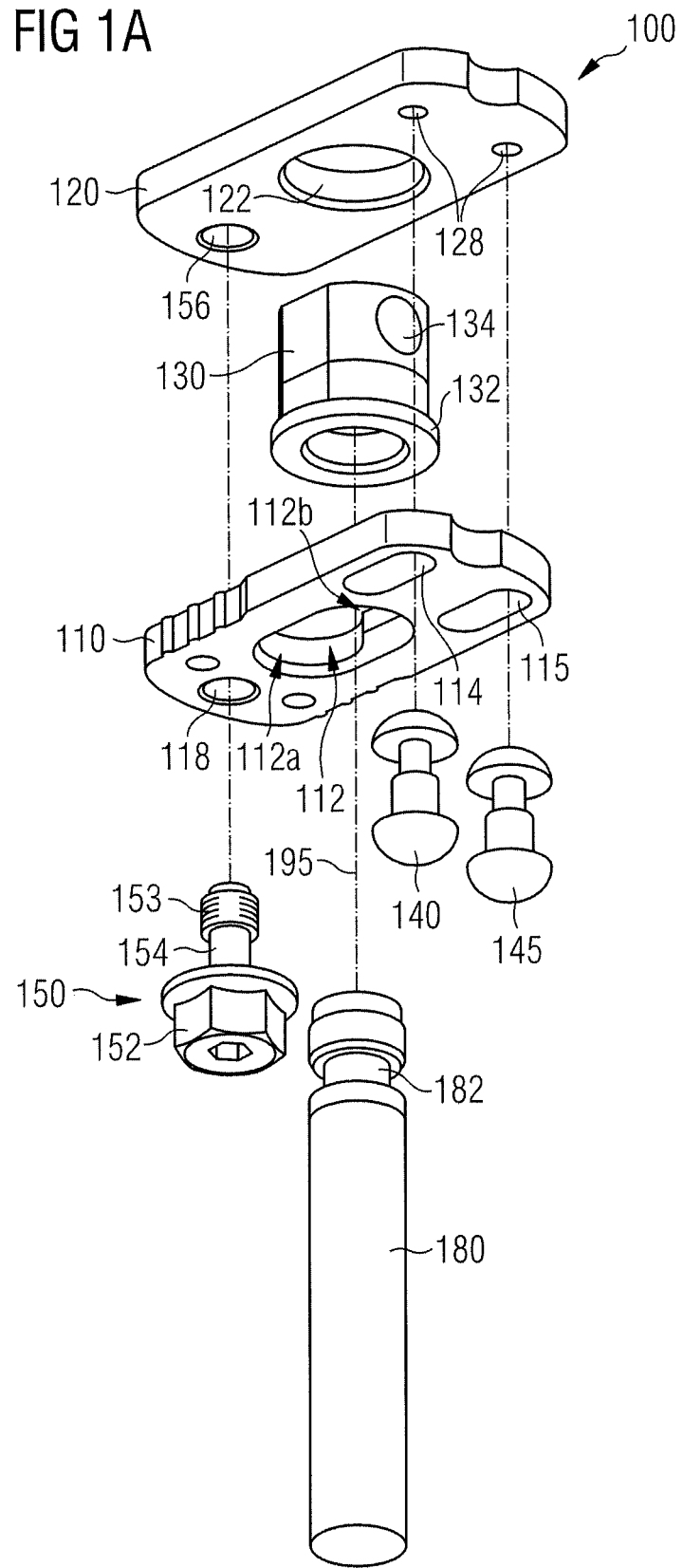
FIG. 1A is an exploded perspective view of a coupling device having two flat coupling elements which can be displaced radially relative to each other for the purpose of locking with a plunger of a valve.

Reference will now be made in detail to the preferred embodiments, examples of which are illustrated in the accompanying drawings, wherein like reference numerals refer to like elements throughout.

To avoid unnecessary repetitions, features or components already explained with reference to a previously described figure will not be explained in detail again later. Also, the embodiment variant described below with reference to the drawing merely represents a limited selection of possible embodiment variants.

FIG. 1A shows an exploded view of a coupling device 100 according to an exemplary embodiment. The coupling device has two flat coupling elements embodied as plates which are labeled with the reference numerals 110 and 120. The coupling element 110 will be referred to hereinbelow as the first coupling element 110 and the coupling element 120 as the second coupling element 120.

The two coupling elements 110 and 120 are connected to each other in a movable manner by a connecting element 140 and by a further connecting element 145. According to the exemplary embodiment shown here the connecting elements 140 and 145 are rivets. Two through-holes 128 are therefore embodied in the second coupling element 120 through which the two rivets 140, 145 extend. As can be seen from FIG. 1A, two slotted holes 114, 115 are embodied in the first coupling element 120. In the assembled state the rivet 140 extends through the slotted hole 114 and the rivet 145 extends through the slotted hole 115. The two slotted holes 114 and 115 allow a restricted radial movability of the first coupling element 110 relative to the second coupling element 120 in relation to a z-axis 195.

Also embodied in the second coupling element 120 is a hole 122 through which an upper part of an adapter element 130 can be inserted. According to the exemplary embodiment shown here the adapter element is a sleeve 130 which has on its lower part of a broader section 132 embodied as a shoulder. The sleeve 130 also has a transverse hole 134. By the transverse hole the sleeve 130 can be coupled to a connection element of a valve actuator not shown in FIG. 1A.

A hole 156 provided with an internal thread is also provided in the second coupling element 120. The function of this hole 156 will be explained in greater detail below.

As can be seen from FIG. 1A, the first coupling element 110 has a central through-hole opening 112. The through-hole opening 112 is in the shape of a keyhole having a first opening area 112a and a second opening area 112b, the two opening areas 112a, 112b being different in size. The longitudinal directions of the keyhole 112 and the two longitudinal holes 114, 115 are oriented in the same way. The upper section of an actuating element 180, which according to the exemplary embodiment shown here is a plunger 180, can be inserted through the first larger opening area 112a. The second opening area 112b is so small that it is only able to accommodate the upper section of the plunger 180 because an annular groove 182 is embodied therein. An edge of the first coupling element 110, which edge delimits the second opening area 112b, can namely engage in this annular groove 182. Since the annular groove 182 has a width along the z-axis 195 which is somewhat larger than the thickness of the first coupling element 110, the plunger 180 can be inserted by an operator into the second opening area 112b, without its having to be twisted in any way, by a movement at right angles to the z-axis 195. This fixes the plunger 180 to the first coupling element 110 along the z-axis with a certain play or with a certain freedom of movement.

This axial play is eliminated by a clamping device 150 which according to the exemplary embodiment shown here is also a component of the coupling device 100. The clamping device 150 has a screw 152 on the tip of which an external thread 153 is embodied. As can be seen from FIG. 1A, the screw 152 extends through a through-hole 118 which is embodied in the first coupling element 110. Located between a screw head of the screw 152 and the front end of the screw 152 with the external thread 153 is a so-called undercut 154.

This undercut 154 it ensures that the screw 152 cannot fall out of the through-hole 118. The entire coupling device 100 can thus be embodied without loose components such as screws or nuts which can easily get lost during assembly or disassembly of the coupling device 100.

The external thread 153 of the screw 152 is complementary to the internal thread of the hole 156 so that, in the assembled state of the coupling device 100, upon actuation of the clamping device 150 the coupling element 110 in this case is firmly clamped to the sleeve 130 over the tip of the plunger 180 (above the annular groove 182) and its end face. In this way the above-described freedom of movement along the z-axis 195 of the plunger 180 in relation to the sleeve 130 is eliminated.

Figure 1B:
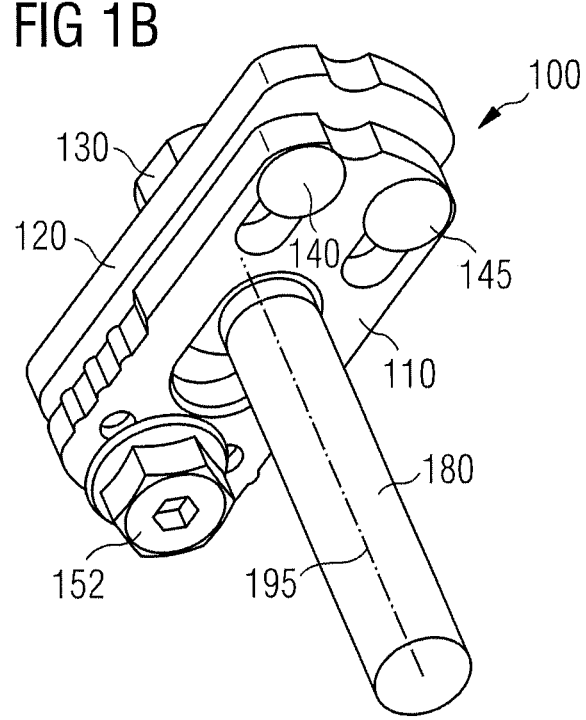
FIG. 1B is the assembled coupling device in a perspective view.
Figure 1C:
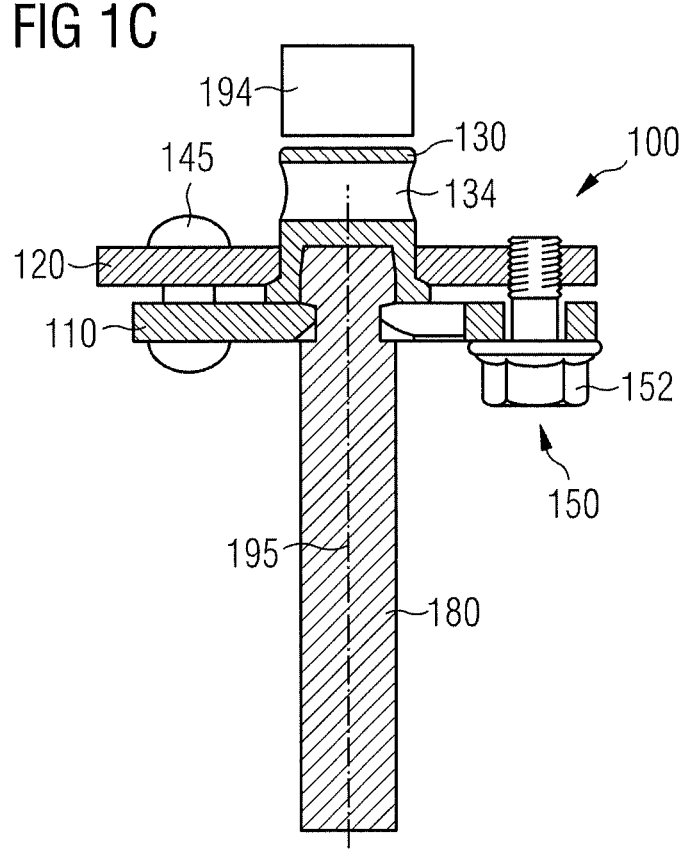
FIG. 1C is the coupling device in a cross-sectional view.

FIG. 1B shows a perspective view of the coupling device 100 after the individual components have been assembled and the clamping device 150 has been actuated. FIG. 1C shows the assembled coupling device 100 in a cross-sectional view.

The tip of the plunger 180 extends into an opening of the sleeve 130. This fixes the plunger 180 and sleeve 130 relative to each other at right angles to the z-axis. The actuated clamping device 150 and the two connecting elements 140, 145 engage in relation to the z-axis 195 at opposing points on the two coupling elements 110, 120. This means that both the lower part of the sleeve 130 and the upper part of the plunger 180 are clamped between the two coupling elements 110, 120. As a result of this relative spatial arrangement of the two connecting elements 140, 145 to the clamping device 150, particularly favorable lever conditions are present for a clamping of sleeve 130 and plunger 180. This enables the clamping device 150 to be actuated by an operator without any great application of force, by a wrench for example.

The second coupling element 120 and/or the first coupling element 110 can be plastically deformable. The advantage of this is that an overtightening of the screw 152 does not lead to the coupling device 100 being damaged. Thus, for example, with an excessively forceful actuation of the clamping device, at least one of the two coupling devices can be bent at least partly reversibly within its allowable deformations. In such cases plastic as well as elastic deformations can occur, though these do not adversely affect the functionality of the overall coupling device.

A connection element 194 which is assigned to a valve actuator and which can be mechanically connected in a manner not shown in the diagram to the sleeve 130 is also shown schematically in FIG. 1C. A connecting bar of the connection element 194 can be used for this purpose in a manner not shown in the diagram which is inserted parallel to the z-axis as play-free as possible into the transverse hole 134 and thus connects the connection element 194 to the coupling device and consequently also to the plunger 180.

It is pointed out that according to the exemplary embodiment depicted here the screw 152 can only be screwed into the hole 156 provided with the internal thread if the first coupling element 110 is located in its radial end position. This means that an incorrect assembly in a half-opened position of the first coupling element 110 is not possible. In addition an installer already recognizes from the fact that it is possible to tighten the screw 152 that the coupling device 100 has been correctly installed.

FIGS. 2A to 2H show a sequence of different assembly steps for mechanically coupling an actuator to an HVAC valve using the coupling device 100.

Figure 2B:
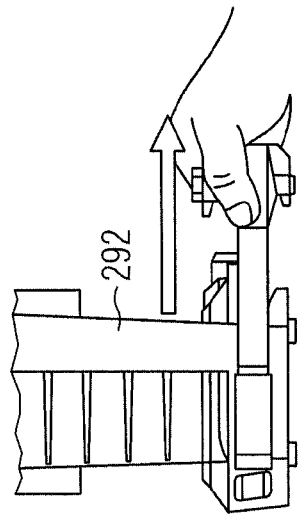
FIGS. 2A and 2E-2H are perspective views and FIGS. 2B-2D are side views in a sequence from FIG. 2A to FIG. 2H of different assembly steps for mechanically coupling an actuator to an HVAC valve using the coupling device depicted in FIGS. 1A to 1C.
Figure 2D:
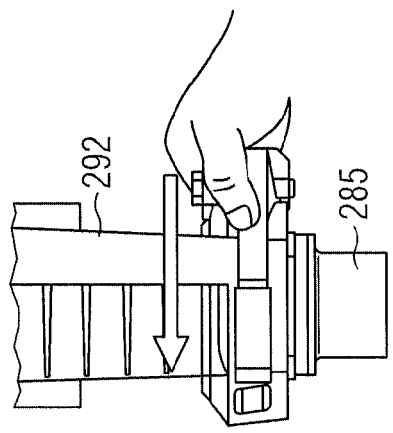
Figure 2A:
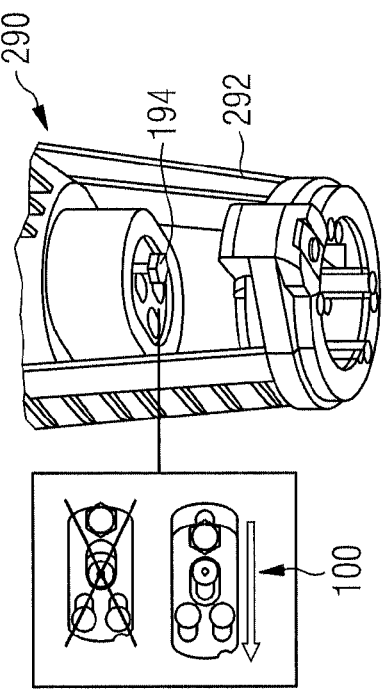

FIG. 2A shows a first assembly step. In this case the coupling device 100 is initially adjusted so that the first coupling element is located in the open position (relative to the second coupling element in a radially-displaced offset position). This position is shown in the insert of FIG. 2A in the lower of the two diagrams.

FIG. 2B shows a second assembly step. In this step a U-shaped retaining element which is arranged at the lower end of the connecting chassis 292 is temporarily displaced from its normal position radially outward into an assembly position.

Figure 2C:
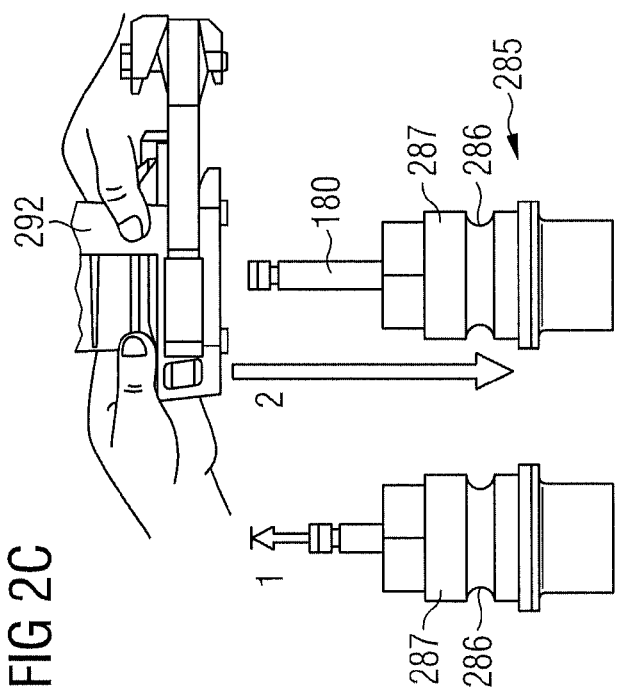

FIG. 2C shows the third assembly step. In this step the plunger 180 of the valve 285 is initially pushed upward. This facilitates later connection of the plunger 180 to the coupling device 100 which is already mounted to the actuator 290 or to the connection element (not shown) of the actuator 290. After the lifting of the plunger 180 the connecting chassis 292 is placed on a connection piece 287 or on a valve neck of the valve 285. Since the retaining element is still in the assembly position, the connecting chassis 292 can be placed on without being obstructed by the retaining element.

FIG. 2D shows a fourth assembly step. In this step the retaining element is pushed from the assembly position radially inward into the normal position. In the normal position the two arms of the retaining element engage from outside into an annular groove 266. This means that except for a small degree of play in the axial direction (along the z-axis) and in relation to the rotational angle position, the relative position between the connecting chassis 292 or the actuator 290 on one side and the connection piece 287 or the valve 285 on the other side is defined.

Figure 2F:
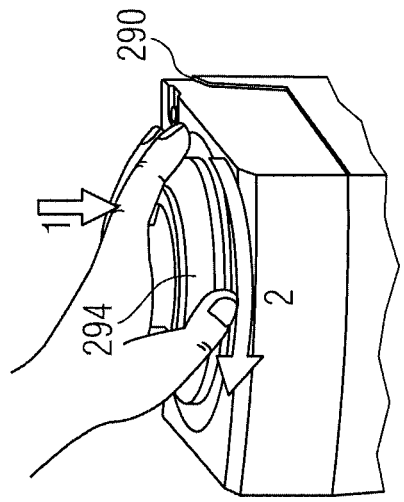
Figure 2H:
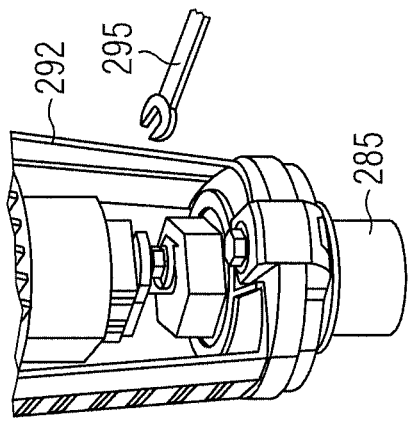
Figure 2E:
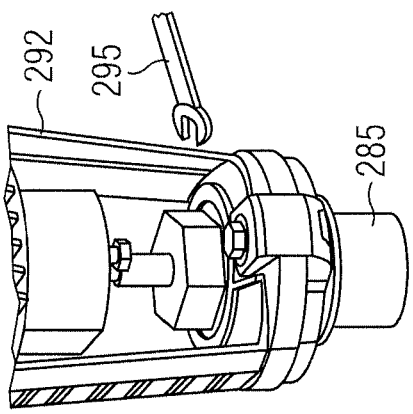

FIG. 2E shows a fifth assembly step. In this step a screw of the retaining element is tightened by a wrench 295 such that the two arms of the retaining element are wedged in the annular groove 286. In this way a play-free clamping of the system formed of connecting chassis 292, retaining element and valve 285 is achieved.

FIG. 2F shows a sixth assembly step. In this case a manual actuating element 294 embodied as a hand wheel is adjusted by an operator such that the connection element of the actuator 290 moves axially with respect to the plunger 180.

Figure 2G:
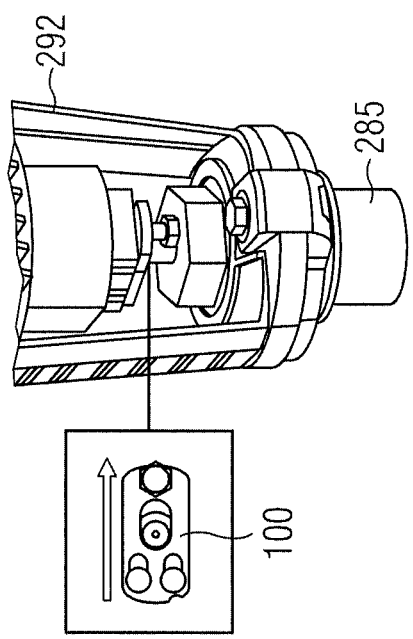

FIG. 2G shows a seventh assembly step. The connection element and the plunger 180 are so close to each other that they can be connected to each other. In this case the first coupling element of the coupling device 100 is again displaced radially inward relative to the second coupling element and to the z-axis so that the plunger 180, as shown in FIG. 1C, is located in the second opening area 112b (see FIG. 1A). As already described above, this defines the relative axial position between the plunger 180 and the coupling device 100 except for a certain freedom of movement.

FIG. 2H shows an eighth assembly step. The clamping device of the coupling device 100 is actuated by a wrench 295. This clamps the tip of the plunger 180 without play between the two coupling elements.

In summary the following remains to be stated: With the coupling device described in this document an axial play-free coupling can be established in a simple manner between the actuating element (plunger) of a valve and the connection element of an actuator. When this is done a form-fit connection is initially established between the end of the plunger and the first coupling element which can have a keyhole-shaped opening. The form-fit connection or the closure of the coupling is established by a radial movement of the first coupling element in relation to the z-axis. The second coupling element is then axially clamped to the first coupling element by the screw of the clamping device. This means that the end of the actuating element (plunger) becomes axially free from play.

The described coupling device 100 has the advantage that the actuator and the valve can be installed in relation to each other at an arbitrary rotational angle position around the z-axis (plunger axis). Assembly and disassembly can be carried out by a technician using conventional tools.

The described coupling device 100 also has the advantage that the clamping or the play-free securing of the coupling device 100 can be realized by just a single screw.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

What is claimed is:

1. A method for mechanically coupling an actuating element of a valve to a connection element of an actuator, where the actuating element has an upper section with a recess formed therein and can be displaced for adjusting the valve along a z-axis and the connection element, at a corresponding orientation of the actuator, can likewise be displaced relative to the valve along the z-axis by means of the actuator, said method comprising
    coupling a first coupling element to the actuating element so that at least a predetermined freedom of movement is provided along the z-axis between the first coupling element and the actuating element, the first coupling element having a central opening with a first opening area and a second opening area, at least one upper section of the actuating element passing through the first opening area, and the second opening area defined at least in part by an edge of the first coupling element that engages in the recess on the upper section of the actuating element such that, except for the predetermined freedom of movement between the first coupling element and the actuating element, the actuating element is fixed to the first coupling element along the z-axis;
    coupling a second coupling element to the actuating element, the second coupling element being linked by a connecting element to the first coupling element; and
    actuating a clamping device, arranged on at least one of the first and second coupling elements such that the first and second coupling elements are braced against each other, and an actuating element coupled to the first coupling element is clamped to the first and second coupling elements along the z-axis without play.

2. The method as claimed in claim 1, further comprising displacing the first coupling element relative to the second coupling element at right angles to the z-axis, after said coupling of the first coupling element to the actuating element and before said actuating of the clamping device.

3. A device for mechanically coupling an actuating element of a valve to a connection element of an actuator, where the actuating element has an upper section with a recess formed therein and can be displaced along a z-axis for adjusting the valve and the connection element, at a corresponding orientation of the actuator relative to the valve, can likewise be displaced along the z-axis by the actuator, said device comprising:
    a first coupling element which can be coupled to the actuating element while providing at least a predetermined freedom of movement between said first coupling element and the actuating element along the z-axis, said first coupling element having a central opening with a first opening area and a second opening area, the first opening area permitting at least one upper section of the actuating element to be passed therethrough, and the second opening area defined at least in part by an edge of said first coupling element that can engage in the recess on the upper section of the actuating element such that, except for the predetermined freedom of movement between said first coupling element and the actuating element, the actuating element is fixed to said first coupling element along the z-axis;
    a second coupling element which can be coupled to the connection element;
    a first connecting element movably linking the two coupling elements to each other; and
    a clamping device, arranged on at least one of said first and second coupling elements, which upon actuation clamps the two coupling elements in relation to each other and to the actuating element, coupled to said first coupling element, along the z-axis without any play.

4. The device as claimed in claim 3, wherein at least one of said first and second coupling elements has a flat shape.

5. The device as claimed in claim 4, wherein said first connecting element permits said first coupling element to be displaced relative to said second coupling element at right angles to the z-axis.

6. The device as claimed in claim 5, wherein said first coupling element can be rotated relative to said second coupling element around an axis of rotation defined by said first connecting element.

7. The device as claimed in claim 5, wherein said first coupling element can be displaced radially relative to said second coupling element in relation to the z-axis.

8. The device as claimed in claim 7, further comprising a second connecting element movably linking said first and second coupling elements.

9. The device as claimed in claim 8, wherein said first connecting element and said clamping device engage at opposing points on the two coupling elements in relation to the z-axis.

10. The device as claimed in claim 9, further comprising an adapter element which can be coupled to said second coupling element and the connection element.

11. The device as claimed in claim 10, wherein said adapter element is shaped such that when said clamping device is actuated said adapter element together with the actuating element is clamped by said first and second coupling elements along the z-axis without play.

12. The device as claimed in claim 11, wherein said adapter element has a transverse hole.

13. The device as claimed in claim 12, wherein said clamping device is a screw having an undercut.

* * * * *